United States Patent [19]
Shimizu et al.

[11] 3,829,761
[45] Aug. 13, 1974

[54] CELL DEVICE FOR MEASURING ELECTRIC CONDUCTIVITY OF LIQUIDS

[75] Inventors: Tetuo Shimizu; Akikazu Nishikawa, both of Tokyo, Japan

[73] Assignee: Denki Kagaku Keiki Co. Ltd., Tokyo, Japan

[22] Filed: Dec. 13, 1973

[21] Appl. No.: 314,525

[52] U.S. Cl. ............................................ 324/30 B
[51] Int. Cl. ............................................ G01n 27/42
[58] Field of Search ...................... 324/30 B, 30 R

[56] References Cited
UNITED STATES PATENTS
2,830,260  4/1958  Del Chiocca .................... 324/30 B
3,457,501  7/1969  Ingram ............................ 324/30 B

*Primary Examiner*—Alfred E. Smith
*Assistant Examiner*—Rolf Hille

[57] ABSTRACT

Mounting means for demountably mounting a cell device for measuring electric conductivity of liquid to a liquid tank so as to insert a detecting cell fixed on one end of a supporter tube of the device into a liquid in the tank through a gate valve attached to an opening in the tank wall is disclosed in accordance with the teaching of this invention. Said means comprises parallel guide rails to be fixed demountably to the outer of the gate valve to extend outwardly, a screw rod supported on the outer end of the rails, and a nut fixed on the end of said supporter tube and drived along said rails by said screw rod.

A detecting cell of the cell device according to this invention, in which a cylindrical electrode and a central electrode are disposed concentrically and electrically insulated by a glass insulator sealed to said electrode by glass-to-metal sealing is also disclosed.

3 Claims, 6 Drawing Figures

CELL DEVICE FOR MEASURING ELECTRIC CONDUCTIVITY OF LIQUIDS

This invention relates to a cell device for measuring electric conductivity of liquids.

More specifically, this invention relates to a cell device of the type the detecting cell thereof is inserted into a tank containing a liquid, through a gate valve attached to the tank wall, to measure electric conductivity of said liquid, wherein an improved means for mounting the cell device to the tank and/or an improved detecting cell keeping high insulation resistance for a long period of time between its electrodes are provided.

The cell device of the type mentioned above is commonly used for measuring electric conductivity of a high temperature, high pressure liquid such as hot water in a high pressure boiler, by continuously immersing the detecting cell into the liquid to be measured, and insulation resistance between two electrodes of the detecting cell decreases gradually during the use because of deposition of contamination contained in the liquid on the surface of the insulator and the deterioration of the insulator.

Therefore, the cell device must be demounted from the liquid tank and repaired or replaced by a new cell device periodically, in order to ensure exact continual measurement for a long time.

It has long been requested to provide mounting means which is capable of mounting and demounting a cell device easily and safely to a tank such as a boiler containing high temperature, high pressure liquid so that the detecting cell thereof in inserted into and drawn out from the liquid though a gate valve attached to the tank wall.

And besides, many of liquids to be measured have electric conductivity as low as that of pure water, and the insulation resistance between two electrodes of the detecting cell of a cell device must be always kept to a very high value in order to measure conductivity of very low values exactly. Therefore, the insulator which insulates two electrodes of the detecting cell must withstand high temperature and high pressure to keep high resistance for a long time under the conditions of high temperature and high pressure.

Conventional cell devices have defects in the points that it is difficult and in some cases is attended with some danger to insert or drawout the detecting cell of the cell device into or from the liquid tank through a gate valve attached to the tank wall, and that the insulation resistance between two electrode of the detecting cell is easy to decrease owing to the deterioration of the insulator which is subjected to high temperature and high pressure of the liquid to be measured.

It is an object of this invention to provide means for mounting an electric conductivity measuring cell device to a tank containing a liquid to be measured, which is capable of inserting and drawing out easily and safely the end portion of the cell device on which a detecting cell is carried into or from the liquid in the tank through a gate valve attached to the tank wall, regardless of pressure of the liquid to be measured in the tank.

It is another object of this invention to provide a detecting cell in which the insulation resistance between two electrodes is kept stable at a high value for a long period of time even if the cell was used under the high temperature and high pressure conditions, and which is capable of measuring electric conductivity of liquid exactly.

A further object of this invention is to provide a cell device for measuring electric conductivity of liquids, which comprises a detecting cell having a long useful life under the high temperature and high pressure conditions, and mounting means capable of easily and safely inserting and drawing out the end portion of the device carrying said detecting cell into or from the liquid tank through a gate valve attached to the tank wall.

This invention as well as features and advantages thereof will be clearly understood from the following detailed description to be read in connection with the accompanying drawings wherein.

In the drawings, the same or corresponding elements or parts are indicated by the same reference numeral.

Figure 1:
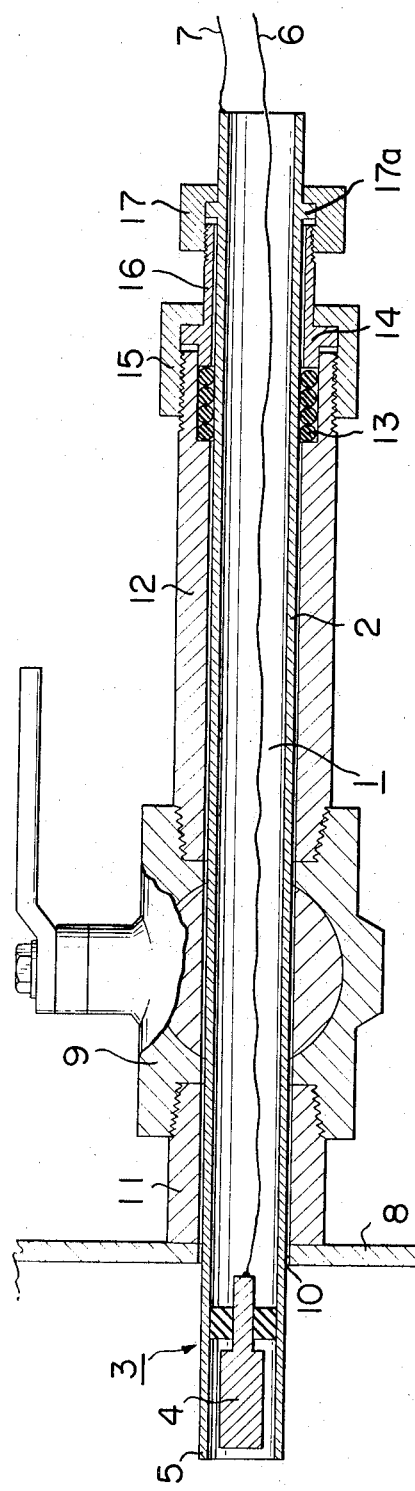
FIG. 1 is a schematic sectional side view of a conventional cell device for measuring electric conductivity of liquids of the type the end portion thereof having a detecting cell is inserted into a liquid tank through a gate valve attached to the tank wall.

In FIG. 1, there is shown a cell device 1 for measuring electric conductivity of liquids, which comprises a supporter tube 2 made of a metal; a detecting cell 3 carried by an end portion of said supporter tube and including two electrode 4 and 5 electrically insulated to each other, and electric leads 6 and 7, and which is mounted by conventional mounting means to a tank 8 such as a high pressure boiler containing a high temperature, high pressure liquid to be measured, so as to insert said end portion of the supporter tube 2 carrying the detecting cell 3 into the liquid in the tank 8 through a gate valve 9 attached to a cell inserting opening 10 by a short tubular member 11.

The conventional mounting means comprises a guide tube 12 having the inner diameter slightly larger than the outer diameter of the supporter tube 2 and attached to the outer end of the gate valve 9, seal packing 13 such as O-rings disposed in the gap between the supporter tube and guide tube, a packing gland 14 fastened to the outer end of the guide tube 12 by a union nut 15 screwed on said end, a tubular member 16 fixed to or formed integrally with said packing gland 14 and extending outwardly through an opening of said union nut 15, and a union nut 17 engaging with a protrusion 17a on the outer surface of the other end portion of said supporter tube than the end portion carrying detecting cell 3 and screwed on the outer end of the tubular member 16 to support the cell device 1 on said tubular member.

In measuring electric conductivity of the liquid in the tank 8 by the cell device 1 mounted to the tank mentioned above, a appropriate voltage is applied between the electrodes 4 and through the electrode leads 6 and 7 and the current flowing between the electrodes through the liquid is measured.

Mounting of the cell device by the conventional mounting means is carried out through the following steps. First, in the state of the gate valve 9 being closed, the end portion of the supporter tube 2 carrying the detecting cell 3 is inserted in the guide tube 12 until the cell reaches just outside of the valve and the union nut 15 is screwed on the outer end of the guide tube 12 to seal liquid-tightly the gap between the supporter tube 2 and the guide tube 12 by the seal packing 13 and the packing gland 14, then the gate valve 9 is opened and the detecting cell 3 carried by the end portion of the supporter tube 12 is inserted into the liquid in the tank 8 through the valve 9 by the pushing force applied to the other end of the tube 2, and lastly the union nut 17 is screwed on the outer end of the tubular member 16 to fasten the cell device 1 in its position.

To demount, the cell device 1 from the tank 8, first the union nut 17 is screwed off from the end of the tubular member 16 and the supporter tube 2 is drawn out gradually from the tank 8, then the gate valve 9 is closed when the detecting cell 3 carried by the supporter tube 2 is brought to the outside of the valve 3, and lastly the union nut 15 is screwed off from the end of the guide tube 12 and the cell device 1 is pulled out and removed from the guide tube 12.

At the time of mounting the cell device to the liquid tank by means of the conventional mounting means as mentioned above, it has always been experienced that it is very difficult to push the supporter tube 2 inwardly through the gate valve in order to insert the detecting cell into the tank, because the large frictional force caused by the seal packing and high pressure of the liquid in the tank counteract to the force to push the supporter tube inwardly. In demounting the cell device from the liquid tank, it is also difficult owing to the large frictional force applied on the peripheral surface of the supporter tube by the seal packing to pull out the supporter tube in order to bring the detecting cell out of the gate valve, when the pressure of the liquid in the tank is not much higher than the atmospheric pressure, and on the other hand it is often dangerous to screw off the union nut on the outer end of the tubular member extending outwardly from the packing gland in order to release the supporter tube from the fastened state, because the supporter tube is suddenly pushed and thrown out from the guide tube by the pressure of the liquid in the tank as soon as said union nut is screwed off and the high temperature, high pressure liquid is ejected from the tank through the opened gate valve and the guide tube, when the pressure of the liquid in the tank is high enough to overcome the frictional force applied on the peripheral surface of the supporter tube by the seal packing.

Besides, in the conventional cell devices of the aforementioned type, there is provided generally with one of detecting cells shown in FIGS. 2, 3 and 4, but these conventional detecting cells have various defects or disadvantages explained in detail hereinafter.

Figure 2:
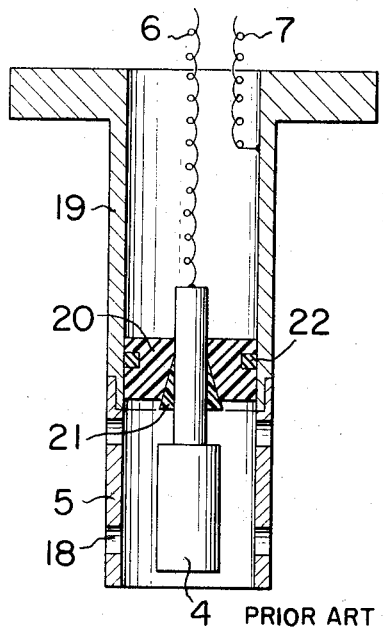
FIGS. 2, 3 and 4 are schematic sectional views showing respectively the conventional detecting cells of various constructions.

The conventional detecting cell shown in FIG. 2 has a construction wherein a cylindrical outside electrode 5 having liquid passage apertures 18 is fixed to one end of a supporter 19 made of a metal tube, which is attached to the end of the supporter tube 2 shown in FIG. 1 or is formed by the end portion of the supporter tube 2, a rod-shaped central electrode 4 is disposed in the outside electrodes 5 concentrically with the electrode 5 and supported by an insulator disk 20 made of synthetic resin such as epoxy or hard rubber on the inner wall of the end portion of said supporter 19, and the small gap between the insulator disk 20 and the electrode 4 and the small gap between the insulator disk 20 and the inner wall of the supporter 19 are respectively sealed liquid-tightly by seal packing 21 and 22 such as rubber rings in order to prevent the leakage of the liquid into the space behind of the insulator disk through which the electrode leads 6 and 7 are led out.

The detecting cell shown in FIG. 2 has the defects in the point that it has a short useful life because the seal packing 21 and 22 are easily deteriorated during the use due to high temperature and high pressure to which the cell is subjected, and the liquid to be measured tends to leak into the space behind of the insulator disk 20 and to decrease insulation resistance between two electrodes to such a value that a large error is introduced in the result of the measurement.

Figure 3:
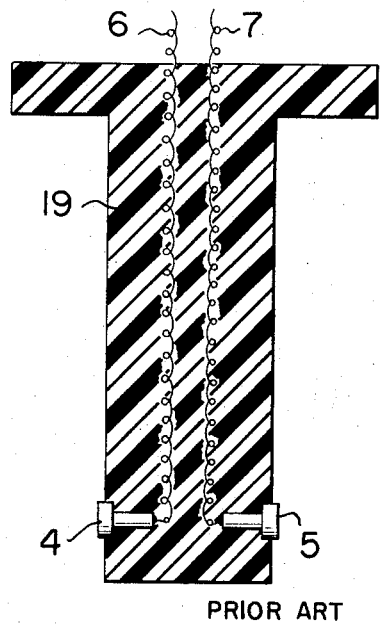

In the conventional detecting cell shown in FIG. 3, two button-shaped electrodes 4 and 5 and leads 6 and 7 thereof are embedded in a molded solid supporter 19 made of synthetic resin such as epoxy resin or rubber so that the head portions of said electrodes are exposed on the opposite side walls of the supporter. This detecting cell also has a defect that it cannot be used under high temperature and high pressure conditions because the insulation property of the supporter is easily deteriorated under such conditions.

Figure 4:
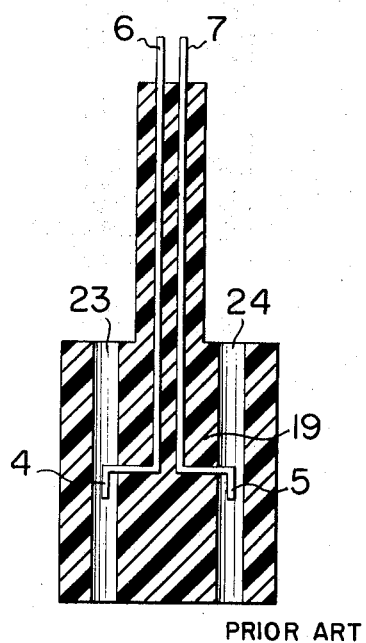

The conventional detecting cell shown in FIG. 4 also has a construction wherein two electrode leads 6 and 7 and two electrodes 4 and 5 which are respectively formed by the end portions of the leads 6 and 7 are embedded a molded supporter 19 in such a manner that two electrodes are respectively disposed in the fluid passage bores 23 and 24 axially extending on the opposite sides of the lingitudinal axis of the supporter.

This detecting cell is advantageously used when a liquid to be measured has relatively high electric conductivity since the length of current path through the liquid between two electrodes is relatively long, but this cell has the same defect as that of the cell shown in FIG. 3.

According to this invention, it is possible to provide an improved mounting means which is capable to mount and demount a cell device easily and safely to a liquid tank through a gate valve attached to the tank wall regardless of the pressure in the tank, and an improved detecting cell of long useful life which is capable to keep high insulation between two electrodes thereof for a long period of time when used under high temperature and high pressure conditions and to make it possible to measure electric conductivity of liquids exactly.

Figure 5:
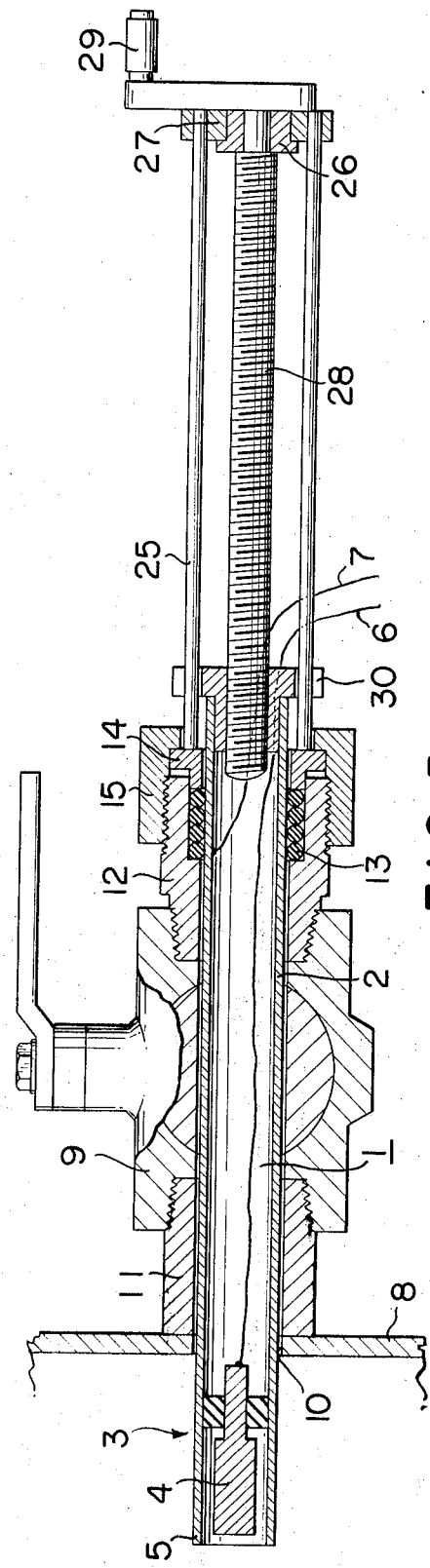
FIG. 5 is a schematic sectional side view of an embodiment of the cell device of this invention.

In FIG. 5 there is shown an embodiment of a cell device of this invention which is provided with mounting means according to this invention. The constructions of the main body portions of the cell device 1 shown in FIG. 5 is generally the same as those of the cell device 1 of FIG. 1, except the detailed construction of the detecting cell 3. However, the mounting means according to this invention comprises seal packing 13 such as O-ring disposed in the gap between the supporter tube 2 of the cell device 1 and the guide tube 12 attached to the outer end of the gate valve 9, a packing gland 14 fastened to the outer end of the guide tube 12 by a union nut 15 screwed on said end, two or more parallel guide rails 25 fixed to or formed integrally with said packing gland 14 and extending outwardly parallel with the axis of the guide tube 12, a bearing 26 supported on the outer ends of said guide rails 25 by a suitable supporting member 27, a screw rod 28 supported rotatably but not movably in axial direction by said bearing 26, a handle 29 fixed to the outer end of said screw rod 28, and a nut 30 provided on the periphery thereof with recesses which engage respectively with said guide rails 27, said nut 30 being screwed on said screw rod 28 and fixed to the end of the supporter tube 2 of the cell device 1 opposite to the end carrying the detecting cell 3.

If it is desired, the inner ends of said parallel guide reals 25 can be fixed to the union nut 15 instead of the packing gland 14.

When the handle 29 is turned clockwise the nut 30 moves right (in FIG. 5) along the guide rails 25 and the supporter tube 2 of the cell device 1 is moved right into the space between said guide rails 25, and when the handle 29 is turned counterclockwise the nut 30 moves left along the guide rails 25 and the supporter tube 2 is moved left out of said space.

In mounting the cell device 1 to the tank 8, the supporter tube 2 of the cell device 1 is moved into the space between the guide rails 25 by turning the handle 29 clockwise and the end portion of the supporter tube 2 on which the detecting cell 3 mounted is inserted in the guide tube 12 in the state of the gate valve 9 being closed, then the union nut 15 is screwed on the outer end of the guide tube 12 to fasten the packing gland to said end in order to seal liquid-tightly the gap between the end portion of the supporter tube and the guide tube by the seal packing, and thereafter the gate valve 9 and the supporter tube 2 is moved left along the guide rails 25 by turning the handle 29 counterclockwise so that the detecting cell 3 mounted on the left end of the supporter tube is inserted into the tank 8 through the valve 9.

To demount the cell device 1 from the tank 8, the handle 29 is turned clockwise to move the supporter tube 2 into the space between the guide rails so that the detecting cell 3 is pulled out from the tank 8, then the gate valve 9 is closed when the detecting cell 3 has been pull out of the valve 9 and the union nut 15 is screwed off from the end of the guide tube 12 so that the cell device 1 and mounting means attached to the device can be demounted from the tank 8.

The detecting cell 3 of the cell device 1 demounted from the tank 8 as mentioned above may be repaired or be replaced by a new detecting cell.

It will easily be understood from the foregoing description that according to this invention it is possible to mount and demount the cell device very easily and without any danger to and from a liquid tank through a gate valve regardless of the liquid pressure in the tank, by handling the handle fixed to the screw rod of the mounting means to move the nut screwed of said screw rod to and fro along the guide rail in order to drive the supporter tube carrying the detecting cell into and out of the tank through the gate valve.

The mounting means according to this invention has a further advantage in the point that the length of the supporter tube of the cell device can be shortened by about a half of that of the convention supporter tube since according to this invention the supporter tube is moved into and out of the space between the guide rails of the mounting means extending outwardly from the packing gland fastened to the outer end of the guide tube of shorter length than that of the conventional means, and the outer end of the supporter tube is always guided and supported by the guide rails.

Figure 6:
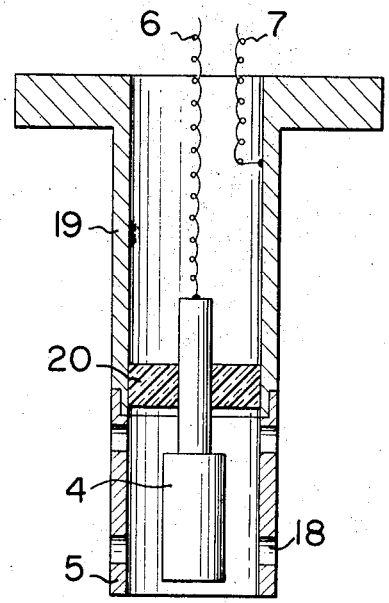
FIG. 6 is a schematic sectional view showing an example of the detecting cell constructed according to this invention.

In FIG. 6, there is shown an embodiment of the detecting cell 3 according to this invention.

The cylindrical or tubular outside electrode 5 is formed of carbon steel or stainless steel such as steel known as "Stainless 316," and is provided in the side wall thereof with a plurality of liquid passage apertures 18. The outside electrode 5 is fixed and electrically connected to one end of a supporter 19 made of a carbon steel or stainless steel tube, which may be attached mechanically to the end of the supporter tube 2 shown in FIG. 5 by suitable means or may be formed by the end portion of said supporter tube 2. If desired, the outside electrode 5 can be formed by the end portion of the supporter 19 made of metal tube.

The central electrode 4 is arranged in the outside electrode 5 concentrically with said outside electrode, and is fixedly supported on the inner wall of the end portion of the supporter 19 by a insulator disk 20. The insulator disk 20 is made, according to this invention, of glass suitable to the glass-to-metal sealing, such as, for example, "CGW-No. 9010 glass" sold by Corning Glass Co. or glass known as "compression seal glass" hand having a linear expansion coefficient of about 97 $\times 10^{-7}$ at the temperature in the range of 30° to 360°C. The central electrode 4 is made of suitable metal having a linear expansion coefficient equal or approximately equal to that of the glass used for a material of the insulator disk 20, and preferably made of Fe-Ni alloy containing 50 percent by weight of iron and 50 percent by weight of nickel.

According to this invention, in fixedly mounting the central electrode 4 on the inner wall of the supporter 19 by the insulator disk 20 of glass, the glass-to-metal sealing commonly used in the technical field of high vacuum devices such as electron discharge devices can be utilized.

Mounting operation of the central electrode 4 is carried out, for instance, by the following steps: First, the central portion of the insulator disk 20 of glass is melted and the stem portion of the central electrode 4 heated to a high temperature is transfixed through the melted central portion of the insulation disk 20 and the disk is sealed to the peripheral surface of the stem of the electrode by the glass-to-metal sealing, then the central electrode 4 and the insulator disk 20 sealed together is inserted in the outside electrode 5 attached to the end of the supporter 19 heated to a high temperature so that the central electrode is arranged concentrically with the outside electrode and the peripheral portion of the disk 20 is melted and sealed to the inner wall of the end portion of the supporter 19, and the whole assembly of the supporter, outside electrode, central electrode and insulator disk is cooled gradually to the room temperature thereby the shrinkage fitting is formed between the end portion of the supporter 19 and the insulator disk 20 because of the shrinkage of the supporter made of carbon steel or stainless steel caused by the cooling from the high temperature is much larger than those of the insulator disk made of galss having relatively low expansion coefficient.

Insulator disks made of glass mentioned above are commercially available from the market, but it is possible to form the insulation disk in any shape in accordance with the cross sectional shape of the supporter.

In the detecting cell 3 according to this invention, the insulator disk 2θ is made of glass and tightly sealed to the peripheral surface of the central electrode 4 and the inner wall of the supporter 19, thus liquid does not leak into the space behind the insulator disk and the insulator disk does not deteriorates under the high temperature and high pressure conditions to which the detecting cell is subjected. Therefore, the detecting cell of this invention has a long-useful life and keeps high insulation resistance between two electrodes for a long period of time when used for the measurement of the electric conductivity of high temperature, high pressure liquid.

It has been found that an embodiment of the detecting cell according to this invention can be satisfactorily used under the conditions of high pressure of 200 kg/cm$^2$ and high temperature of 250°C.

In the embodiment shown in FIG. 6, the central electrode 4 is supported on the inner wall of the supporter 19 by the insulator 20, but the central electrode 4 may be supported on the inner wall of the outside electrode 5 by sealing the periphery of the insulator disk 5 when the outer electrode is formed by the end portion of the supporter or the outer electrode is liquid-tightly attached to the end of the supporter.

The detecting cell constructed according to this invention can be satisfactorily used not only in the cell device for measuring electric conductivity of liquid of the type which is inserted into a liquid tank through a gate valve but in the cell device of the other type which is, for instance, dipped into the liquid to be measured through open free surface of the liquid.

While this invention has been described with reference to the specific embodiments herein disclosed, it is not confined to the details as set force and this application is intended to cover any modifications or changes that may come within the scope of the following claims.

What we claim is:

1. In a cell device for measuring electric conductivity of liquids, comprising a supporter tube, a detecting cell fixed on one end of said supporter tube and having two electrodes with electrical leads therefor electrically insulated to each other by an insulator member, and mounting means for demountably mounting said supporter tube and detecting cell to a liquid tank so as to insert said detecting cell into liquid in the tank through a gate valve attached to an opening in the tank wall, improved mounting means characterized in that which comprises parallel guide rails to be fixed demountably to the outer end of the gate valve to extend outwardly from said valve, a screw rod supported at the outer end thereof on the outer ends of said guide rails rotatably but inmovably in axial direction and extending in parallel with said rails, and a nut fixed on said supporter tube at the end opposite to the end on which the detecting cell is fixed and screwed on said screw rod so that the nut cooperates with said guide rails to move in axial direction along said guide rails in response to the rotation of said screw rod.

2. In a cell device for measuring electric conductivity of liquid, comprising a supporter tube, a detecting cell fixed on one end of said supporter tube and having two electrode with electrical leads therefor electrically insulated to each other by an insulator member, and mounting means for demountably mounting said supporter tube and detecting cell to a liquid tank so as to insert said detecting cell into liquid in the tank through a gate valve attached to an opening in the tank wall, improved mounting means characterized in that which comprises two or more parallel guide rails having inner ends to be fixed demountably to the outer end of the gate valve by a union nut, a screw rod positioned in parallel with said guide rails in the space between said rails and supported at the outer end portion thereof rotatably but inmovably in axial direction on the outer ends of said guide rails by a bearing fixed to said outer ends of the rails, a operating handle fixed on the outer end of said screw rod, and a nut fixed to said supporter tube at the end opposite to said one end on which the detecting cell is fixed and screwed on said screw rod, said nut has on the periphery thereof means which cooperate with said guide rails to prevent rotation of the nut and to allow the nut and said supporter fixed thereto to move in axial direction along said guide rails in response to the rotation of said screw rod.

3. In a cell device for measuring electric conductivity of liquids, comprising a supporter tube, a detecting cell fixed on one end of said supporter tube and having two electrodes with electrical leads therefor electrically insulated to each other by an insulator member, and mounting means for demountably mounting said supporter tube and detecting cell to a liquid tank so as to insert said detecting cell into a liquid in the tank through a gate valve attached to an opening in the tank wall, combination of the detecting cell and mounting means characterized in that said detecting cell comprises a cylindrical outside electrode fixed on or formed by the end portion of a supporter made of a metal tube, a rod shaped central electrode disposed in said outside electrode concentrically therewith and supported on said outside electrode or supporter and electrical insulated from said outside electrode by an insulator member made of glass hermetically sealed to the peripheral surface of the central electrode and the inner wall of the outside electrode or supporter by glass-to-metal sealing, and said mounting means comprises two or more parallel guide rails to be fixed demountably to the outer end of the gate valve to extend outwardly from said valve, a screw rod supported at the outer end thereof on the outer ends of said guide rails rotatably but inmovably in axial direction and extending in parallel with said rails and a nut fixed on the supporter tube at the end opposite to the end on which the detecting cell is fixed and screwed on said screw rod so that the nut cooperates with said guide rails to move in axial direction along said guide rails in response to the rotation of said screw rod.

* * * * *